United States Patent Office 3,505,308
Patented Apr. 7, 1970

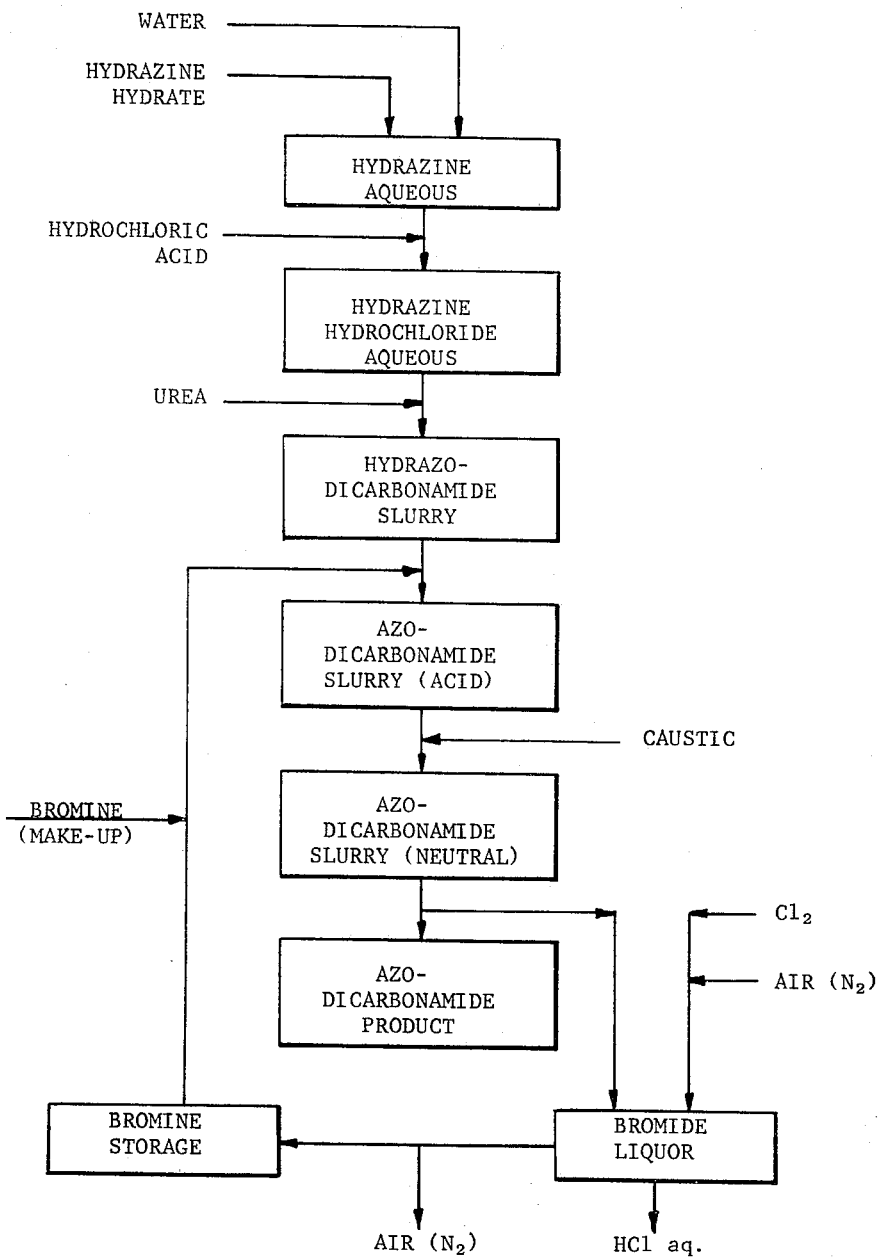

3,505,308
PRODUCTION OF AZODICARBONAMIDES
UTILIZING BROMINE
Eric Smith, Madison, John E. Pregler, Wallingford, and Gerhard F. Ottmann, Hamden, Conn., assignors to Olin Mathieson Chemical Corporation
Filed Oct. 27, 1966, Ser. No. 589,911
Int. Cl. C07c *107/02*
U.S. Cl. 260—192                    10 Claims

ABSTRACT OF THE DISCLOSURE

Azodicarbonamide having particle size especially suitable as a blowing agent in plastics and rubber compositions without the necessity of any grinding or sizing is prepared in two steps by synthesizing hydrazodicarbonamide in an aqueous suspension by reacting hydrazine with excess urea, adding bromine in excess to oxidize hydrazodicarbonamide to azodicarbonamide and separating the product. The mother liquor is suitably chlorinated to recover bromine which is recycled.

---

This invention relates to an improved method for preparing azodicarbonamide. More specifically it relates to the process of producing azodicarbonamide by reacting hydrazine and urea, to form a slurry of hydrazodicarbonamide, oxidizing the hydrazodicarbonamide in the slurry with bromine to form a slurry of azodicarbonamide in bromide liquor and separating the azodicarbonamide product. In a further embodiment of the invention, chlorine is introduced into the resulting bromide liquor, bromine is recovered therefrom and recycled to the oxidation step.

Azodicarbonamide is a well known blowing agent, which is commercially available. It is an organic compound, which at temperatures between about 160° and 200° C. evolves gases which are principally nitrogen.

Chemical compounds which, like azodicarbonamide, evolve gases at suitably elevated temperatures are useful as blowing agents. They are utilized in the manufacture of various foams and sponges which are characterized by their extensive cellular structure and low ratio of weight to volume. Foam materials, especially plastic foams, have wide application as thermal insulation, life jackets, seat cushions, and package fillers.

Hydrazodicarbonamide (biurea) has been prepared by the reaction of hydrazine and urea, for example, by the processes of U.S. Patents 2,692,281 or 3,227,753.

Azodicarbonamide (azoformamide) has been prepared by the method disclosed in B.I.O.S. Final Report No. 1150 by oxidizing a hydrazoamide with an alkali metal chromate, specifically sodium dichromate.

In this prior art process, there are several disadvantages. Sodium dichromate is expensive, it has a high molecular weight and requires the use of large amounts of the compound to accomplish the oxidation. The rate of reaction is relatively slow, taking several hours to produce a batch of azodicarbonamide. Further, the deep green color of the chromate ions masks the orange colored azo compound, to such an extent that it is difficult to determine the end point of the reaction. In addition, chromium compounds are skin irritants and cause health problems if any chromium residues remain in the product. Serious and expensive waste disposal problems also arise with use of chromium.

More recently, chlorine has been used to oxidize hydrazodicarbonamide to azodicarbonamide:

U.S.S.R. Patent 138,930 of 1961 discloses the use of mixtures of chlorine and bromine for the oxidation of hydrazodicarbonamide to azodicarbonamide.

U.S. Patent 3,190,873 of 1965 and equivalent Belgian Patent 627,533 of 1963 disclose passing chlorine gas into a suspension of hydrazodicarbonamide (hydrazoformamide) in concentrated HCl, containing a bromide, to produce azodicarbonamide (azoformamide) in 93% yield.

Belgian Patent 631,410 of 1963 discloses passing chlorine gas into an aqueous suspension of hydrazodicarbonamide containing minor proportions of bromine, or a bromide, to produce azodicarbonamide in yields of 93–99%. With chlorine alone, yields are 35–38%.

In these processes, the chlorine must be introduced slowly, with careful control, to avoid extensive formation of by-products by side reactions and over-oxidation of the desired product. Bromine reacts rapidly and does not react with or over-oxidize the desired product. The damaging side-effects of chlorine, even in the presence of bromine, are avoided.

Further, the azodicarbonamide product of the processes of the prior art has generally required grinding, sizing, re-grinding oversized particles, re-sizing, and re-working undersized particles to provide the plastic and rubber users with a product of the size suitable for the blowing art. It is a particular and unexpected advantage of the process of this invention that an azodicarbonamide product is produced directly from the process which is suitable for use as a commercial blowing agent without any sizing or grinding.

The median particle size is determined in one method microscopically, by measuring the length of the major axis of the particles, dispersed in mineral oil. Alternatively, median particle size is determined by measuring the change in electrical resistance of a dispersion of particles in a salt solution, as it is pumped through a narrow orifice (Coulter counter). By these methods of measurement, the azodicarbonamide produced by the process of this invention has a median particle size in the desired range of 7 to 9 microns (Coulter counter) and 5 to 6 microns microscopically.

The process of the present invention generally comprises:

(1) Reacting hydrazine with a stoichiometric excess of urea in acid aqueous solution to form a first slurry of solid hydrazodicarbonamide in a first aqueous phase;

(2) Adding a stoichiometric excess of elemental bromine to said first slurry at a temperature of 20° to 60° C. to form a second slurry of solid azodicarbonamide in a second aqueous phase; and (3) Separating said solid azodicarbonamide from said second aqueous phase.

In step (1), the reaction of urea with hydrazine in acid solution to form hydrazodicarbonamide, the preferred acid is hydrochloric acid. Other hydrohalogen acids, for example, hydrobromic acid, are suitable. Sulfuric and phosphoric acids are useful in the process of this invention but form difficulty soluble hydrazine salts. The subsequent reaction with urea is slower and more difficult to complete. Acetic acid is also suitable for use. Approximately two equivalents of acid per mole of hydrazine is appropriate and ordinarily some excess acid is used. The pH of the reaction mixture is not critical and suitably varies from 1 to 7 without significant effect on overall yield or quality of product.

Advantageously, sufficient water is used in forming the acid solution to result in a pumpable or stirrable slurry of the hydrazodicarbonamide formed. Conveniently, the resulting slurry contains about 20 percent solids, but this may vary from 5 to 30 percent by weight, depending on equipment capability. Greater dilution limits the capacity of equipment.

Stoichiometrically 2 moles of urea are required per mole of hydrazine but an excess of up to 100 percent increases the yield, shortens reaction time and produces a slurry of hydrazodicarbonamide in a first aqueous phase, which in subsequent operations yields azodicarbonamide in finely divided form, suitable for use as a blowing agent without the necessity of grinding and sizing. Preferably the molar ratio of urea to hydrazine is from 3:1 to 4:1.

Using the concentrations and proportions described, optimum results are obtained by refluxing the slurry, after addition of the urea at atmospheric pressure, for about one to two hours. Unless the temperature of the mixture is raised to reflux, the yield is decreased. Longer times appear to offer no advantage and unnecessarily occupy the equipment.

Under the condition indicated above to be preferable in the operation of step (1), yields of azodicarbonamide are usually from 90 to 95 percent of theory.

It is a particular advantage of the process of this invention that the slurry of hydrazodicarbonamide prepared according to step (1) is especially suitable for oxidation with bromine to form a slurry of azodicarbonamide. The presence of ammonium chloride and urea in the aqueous phase is advantageous in producing azodicarbonamide of desirable particle size, without grinding or screening. In addition, any possibility of forming the dangerously explosive $NCl_3$ from the $NH_4Cl$ present in the slurry is avoided by the use of bromine. It is known that bromine does not react with $NH_4Cl$ to form $NBr_3$ and no evidence of its presence has been observed in the process of this invention.

In the bromine oxidation of step (2) of the process of this invention, the bromine is introduced into the slurry of 5 to 30 percent solid hydrazodicarbonamide formed in step (1). The bromine is preferably added as liquid bromine. Minor amounts of liquid water mixed with bromine are of no consequence and recovered, wet, liquid bromine is particularly convenient. Additionally, the solids concentration in the slurry is not significantly changed and utilization of the equipment is especially advantageous. Bromine dissolved in water is suitable but usually this undesirably and unnecessarily dilutes the reaction mixture. Bromine vapor is advantageous in continuous operation, when distilling recovered bromine is appropriately introduced, without the necessity of condensation, into the hydrazodicarbonamide slurry.

Stoichiometrically one mole of bromine is required per mole of hydrazodicarbonamide to be oxidized. One mole of bromine per mole of hydrazine originally charged provides an excess of 5 to 10 percent over theory. From 5 to 20 percent excess is ordinarily ample to insure yields of 95 to 99 percent of azodicarbonamide. Molar ratios of 1.0:1 to 1.2:1 are suitable. Greater excesses than 20 percent of bromine do not appear to improve yields further, are wasteful and unnecessarily overload the bromine recovery system, adding to the cost of operation. However, less than the stoichiometric amount of bromine lowers yields and results in a product which contains unoxidized hydrazodicarbonamide.

The bromine oxidation of step (2) is exothermic and appropriate means are provided to control the temperature between about 20° C. and 60° C. At higher temperature, yields decrease and at lower temperatures, the reaction rate is inconveniently slow. The reaction vessel is suitably jacketed and cooled, for example, by circulating liquid in the jacket or through cooling coils placed inside the vessel. A particularly advantageous means of operation is to reduce the pressure on the reaction mixture until the boiling point is between about 50° C. and 60° C. The heat of reaction is then converted to heat of vaporization which is conveniently removed in the condenser system.

After addition of bromine is complete, the reaction mixture is advantageously, though not necessarily, maintained at 20° to 60° C. for 0.5 to 4 hours. The solid azodicarbonamide is separated from the reaction mixture with or without cooling by any convenient means including, for example, centrifuging, filtering or settling. It is appropriately washed with water and the washings are combined with the bromide liquor for bromine recovery. Advantageously for drying, the azodicarbonamide is washed with acetone, alcohol or isopropanol and then dried.

Since the slurry of azodicarbonamide and the bromide liquor are acid, it is advantageous to neutralize the slurry before filtering or the liquor after filtering with caustic. This permits the use of cheaper equipment, not resistant to corrosive acids, in the filtration and recovery operations. For this purpose 23 percent aqueous caustic is suitable or any more or less concentrated alkali. Suitably neutralized to a pH of about 7, the slurry or liquor is appropriately handled in equipment not resistant to corrosive acids.

In a particularly advantageous modification of the invention, the bromine is recovered from the bromide liquor, whether neutralized or not, by introducing chlorine thereinto. Chlorine gas, diluted if desired with air or nitrogen, is most convenient. Other sources of chlorine active to liberate bromine from bromides are suitable including, for example, sodium hypochlorite solutions, bleach liquor or calcium hypochlorite solid or in solution. Appropriately the liquor is heated during or after addition of chlorine or both and bromine is distilled overhead. A stream of air or other inert gas aids in removing the liberated bromine. The bromine vapors are passed directly into a batch of hydrazodicarbonamide slurry for oxidation to azodicarbonamide, or the bromine is condensed as liquid bromine and stored for later re-use. Recovery of bromine is ordinarily about 90 to 95 percent. The remaining solution of salt or hydrochloric acid is discarded or the hydrochloric acid solution is suitably reused to neutralize further quantities of hydrazine.

The process of this invention is illustrated by the accompanying flow sheet. Hydrazine hydrate is diluted by mixing with water to form hydrazine aqueous. Hydrochloric acid is added to neutralize and to convert the hydrazine to hydrazine hydrochloride aqueous. Urea is added and reacts with the hydrazine hydrochloride to form a slurry of hydrazodicarbonamide. Bromine, suitably a mixture of recycle and fresh (makeup) bromine is added to the hydrazodicarbonamide slurry, to convert it to a azodicarbonamide slurry, which is still acid and now contains dissolved bromide. Optionally the acid is neutralized in the slurry by the addition of caustic. The azodicarbonamide is separated as product from the bromide liquor. The latter is chlorinated, blowing out the bromine with a stream of air. Bromine is separated from the air stream and retained in bromine storage for recycle use. Residual air and HCl aqueous are discharged from the process.

EXAMPLE I (A) Hydrazodicarbonamide

Water (50.0 g.) and hydrazine hydrate (50.0 g.; 1 gram mole) were mixed in the reaction flask and concentrated hydrochloric acid (200.0 g. of 37–38 percent HCl) was added dropwise, over 35 minutes, with stirring and cooling, at 20–25° C. Urea (216.0 g.; 3.6 gram moles) was added and the solution was heated to reflux. The solution was stirred at reflux (111–114° C.) for 2 hours. The pH of the solution was initially 1 and within 21 minutes had achieved a constant pH of 7. At the end of the 2 hour period, water (146 ml.) was added and the slurry cooled to room temperature.

(B) Azodicarbonamide

Bromine (160.0 g.) was added dropwise over 10 minutes, with stirring and cooling at 25–30° C. to the slurry of hydrazodicarbonamide prepared in Example I (A). When the bromine addition was completed, the reaction mixture was stirred for a further 2 hours and then filtered. The cake was washed with water (500 ml.) until the washings were free from halide ion. The cake was finally washed with 100 ml. of isopropanol. As much isopropanol as possible was filtered off and the damp cake was crumbled into a dish. The product was dried overnight at 60° C. During the initial stages of drying, the agglomerates were several times broken up with a spatula. The azodicarbonamide product weighed about 110 g. and melted at 203° C. with decomposition. The purity of the product, determined by its solubility in dimethyl sulfoxide, was 99.5–100 percent. Conversion was about 99.6 percent and the yield was about 95 percent, based on hydrazine charged. The median particle size of the product, by microscopic examination, was about 5 to 6 microns and 7 to 9 microns by Coulter counter. The product was a free-flowing powder, free from agglomerates or aggregates.

(C) Bromine recovery

A charge of 506.5 g. of filtrate from (B) containing 0.9665 mole of Br⁻ ion was heated to 85–88° C. while introducing a stream of chlorine diluted with air. Bromine and water were condensed from the effluent vapor stream. The reaction was maintained at 85–88° C. for 2.5 hours until all the bromine had been distilled out. The chlorine addition was discontinued when the color of the reaction solution became noticeably lighter; the air flow was continued until the red-orange bromine color disappeared.

The bromine recovery was 87.4 percent. The bromine recovered was used in the next bromine oxidation of hydrazodicarbonamide to azodicarbonamide as in Example I(B).

EXAMPLE II (A) Hydrazodicarbonamide

A 500-gallon kettle was charged with 150 pounds of 85 percent hydrazine hydrate (2.54 pound moles of $N_2H_4$) and diluted with 31.4 pounds of water. A total of 583 pounds of 32 percent hydrochloric acid (5.1 pound moles of HCl) was added slowly with stirring maintaining the temperature below 30° C. After the addition was complete, 548 pounds (9.14 pound moles) of urea was added. This cooled the reaction mixture to about 5° C. It was heated under reflux at 111–114° C. for two hours, cooled and diluted by adding 415 pounds of cold water to form a slurry of finely divided hydrazodicarbonamide.

(B) Azodicarbonamide

The pressure on the hydrazodicarbonamide slurry prepared in Example II(A) was reduced until the mixture refluxed at 50° C. Maintaining that temperature, 446 pounds (2.78 pound moles) of bromine was added during a period of about 150 minutes. The mixture was then stirred for 2.5 hours while cooling to room temperature. Caustic (970 pounds of 23 percent NaOH) was added, maintaining the temperature below 40° C., to a final pH of 8. The slurry of azodicarbonamide was filtered, the cake was washed until free from halide ions and dried in a vacuum rotary drier at 60° C. for 12–18 hours. Yield, 239 pounds (2.06 pound moles) or 81 percent of theory based on the hydrazine charged of azodicarbonamide assaying 99.5 percent pure. Median particle size was 7 to 9 microns (Coulter counter) and about 5 microns microscopically. The product was suitable for use without any grinding in the manufacture of foamed plastics.

(C) Bromine recovery

The combined filtrate and washings from (B) were acidified to pH 6 to 7 by adding concentrated sulfuric acid and heated to reflux at 95–99° C. Chlorine, diluted with nitrogen, was passed into the hot, vigorously stirred solution until no more bromine distilled. The distillate was condensed and collected, recovering as bromine 95 percent of the bromide ion charged. The recovered bromine was used in the next batch of hydrazodicarbonamide oxidized to azodicarbonamide as in Example II(B).

EXAMPLE III

Experiments were performed showing the unexpected advantages of bromine oxidation of hydrazodicarbonamide in the slurry in which it is formed, compared with preformed hydrazodicarbonamide. The oxidations were carried out with preformed hydrazodicarbonamide slurried in water alone, or containing dissolved ammonium chloride or urea. In each case, the azodicarbonamide product was unacceptable for use as a blowing agent without grinding, screening and reworking oversize material.

(A) Oxidation of preformed hydrazodicarbonamide in water

A slurry was prepared by stirring 100.75 g. (0.854 gram mole) of preformed hydrazodicarbonamide in 306.25 g. of water. Bromine (143.5 g.; 0.897 gram mole) was added to the stirred slurry dropwise during 10 minutes at 25–30° C. When the bromine addition was completed, the reaction mixture was stirred for a further 2 hours and then filtered. The cake was washed with water (500 ml.) until the washings were free from halide ions. The cake was finally washed with 100 ml. of isopropanol. As much of the isopropanol as possible was filtered off and the damp cake was dried overnight at 60° C. During the initial stages of drying, the agglomerates were several times broken up with a spatula. The yield was over 99 percent but median particle size was 18 microns (Coulter counter) and 10 microns (microscopic). The particle size of the product rendered it unsatisfactory for use as a blowing agent without a further operation of grinding.

(B) Oxidation of preformed hydrazodicarbonamide in water containing dissolved urea A slurry was prepared by stirring 100.75 g. (0.854 gram mole) of preformed hydrazodicarbonamide in 306.25 g. of water containing 60 g. (1 gram mole) of dissolved urea. Bromine (143.5 g.; 0.897 mole) was added to the stirred slurry dropwise during 10 minutes at 25–30° C. When the bromine addition was completed, the reaction mixture was stirred for a further 2 hours and the product was separated, washed and dried as described in Example III(A). The yield was over 9 percent but median particle size was 19 microns (Coulter counter). Microscopically, the median particle size of the product was about 8.4 microns. This product was unsatisfactory for direct use as a blowing agent.

(C) Oxidation of preformed hydrazodicarbonamide in water containing dissolved ammonium chloride A slurry was prepared by stirring 100.75 g. (0.854 gram mole) of preformed hydrazodicarbonamide in 306.25 g. of water containing 53.5 g. (1 gram mole) of ammonium chloride. Bromine (143.5 g.; 0.897 mole) was added to the stirred slurry dropwise during 10 minutes at 25–30° C. When the bromine addition was completed, the reaction mixture was stirred for a further 2 hours and the product was separated, washed and dried as described in Example III(A). The yield was over 99 percent but median particle size was 15 microns (Coulter counter). Microscopically, the median particle size of the product was about 8.4 microns. The particle size of this product was unsatisfactory for direct use as a blowing agent.

What is claimed is:

1. Process for producing azodicarbonamide which consists essentially of the steps of:
   (1) reacting hydrazine with a stoichiometric excess of urea in acid aqueous solution to form a first slurry of solid hydrazodicarbonamide in a first aqueous phase;
   (2) adding a stoichiometric excess of elemental bromine as the sole ozidizing agent to said first slurry at a temperature of 20° to 60° C. to form a second slurry of solid azodicarbonamide in a second aqueous phase;

(3) separaating said solid azodicarbonamide from said second aqueous phase.

2. Process as claimed in claim 1 in which said urea is in a molar ratio to said hydrazine of 2:1 to 4:1.

3. Process as claimed in claim 1 in which said first slurry has a solids concentration of 5 to 30 percent by weight.

4. Process as claimed in claim 3 in which said solids concentration is about 20 percent by weight.

5. Process as claimed in claim 1 in which said first slurry after addition of urea is complete is refluxed at atmospheric pressure for 0.5 to 5 hours.

6. Process as claimed in claim 1 in which said bromine is in a molar ratio to said hydrozodicarbonamide of 1.0:1 to 1.2:1.

7. Process as claimed in claim 1 in which said bromine is added as liquid bromine.

8. Process as claimed in claim 1 in which said second slurry after addition of bromine is complete is maintained at 20° to 60° C. for 0.5 to 4 hours.

9. Process as claimed in claim 1 in which said second aqueous phase, after separation of said solid azodicarbonamide, is treated to recover bromine by chlorinating said second aqueous phase and distilling bromine therefrom.

10. Process as claimed in claim 9 in which said bromine is recycled to said step (2) of claim 1 and oxidizing further amounts of hydrazodicarbonamide therewith.

References Cited

UNITED STATES PATENTS

| 3,190,873 | 6/1965 | Porter | 260—192 |
| 3,225,026 | 12/1965 | Huibers et al. | 260—192 |

OTHER REFERENCES

Kenner and Stepman, "The Compounds of Alkylamines With Esters of Azo Dicarboxylic Acid," 1952, Journal of the Chemical Society (London), pp. 2089–2094, pertinent pages 2089, 2091–92.

Ford and Rust, "Some Unsymmetrical Azo-Nitriles," 1958, Journal of the Chemical Society (London), pp. 1297–1298.

CHARLES B. PARKER, Primary Examiner

C. F. WARREN, Assistant Examiner

PO-1050
(5/69)

UNITED STATES PATENT OFFICE
CERTIFICATE OF CORRECTION

Patent No. 3,505,308        Dated April 7, 1970

Inventor(s) Eric Smith, John E. Pregler and Gerhard F. Ottmann

It is certified that error appears in the above-identified patent and that said Letters Patent are hereby corrected as shown below:

Column 6, line 43, "9" should read --99--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents